US010502121B2

(12) United States Patent
Skopil

(10) Patent No.: US 10,502,121 B2
(45) Date of Patent: Dec. 10, 2019

(54) PRESSURE WAVE SUPERCHARGER COOLING SYSTEM AND METHOD

(71) Applicant: Antrova AG, Stein am Rhein (CH)

(72) Inventor: Mario Skopil, Birmensdorf (CH)

(73) Assignee: Antrova AG, Stein am Rhein (CH)

(*) Notice: Subject to any disclaimer, the term of this patent is extended or adjusted under 35 U.S.C. 154(b) by 354 days.

(21) Appl. No.: 15/327,938

(22) PCT Filed: Jul. 24, 2015

(86) PCT No.: PCT/EP2015/066977
§ 371 (c)(1),
(2) Date: Jan. 20, 2017

(87) PCT Pub. No.: WO2016/012582
PCT Pub. Date: Jan. 28, 2016

(65) Prior Publication Data
US 2017/0211463 A1    Jul. 27, 2017

(30) Foreign Application Priority Data

Jul. 24, 2014  (EP) ................................. 14178435
Aug. 11, 2014  (EP) ................................. 14180557

(51) Int. Cl.
*F02B 33/42*     (2006.01)
*F04F 13/00*     (2009.01)
(Continued)

(52) U.S. Cl.
CPC ............ *F02B 33/42* (2013.01); *F02B 39/005* (2013.01); *F02B 39/14* (2013.01); *F04F 13/00* (2013.01)

(58) Field of Classification Search
CPC ........ F02B 33/42; F02B 39/14; F02B 39/005; F04F 13/00
(Continued)

(56) References Cited

U.S. PATENT DOCUMENTS 2,759,660 A    8/1956  Boszormenyi et al.
2,766,928 A *  10/1956  Boszormenyi .......... F04F 13/00
                                                    415/134
(Continued)

FOREIGN PATENT DOCUMENTS

DE    102006020522 A1    11/2007
DE    102012002022 A1     8/2013
(Continued)

OTHER PUBLICATIONS

International Search Report (English and German) and Written Opinion (in German) for PCT/EP2015/066977, dated Nov. 18, 2015; ISA/EP.

*Primary Examiner* — Phutthiwat Wongwian
*Assistant Examiner* — Edward Bushard
(74) *Attorney, Agent, or Firm* — Harness, Dickey & Pierce, P.L.C.

(57) ABSTRACT

A pressure wave supercharger for compressing fresh air for an internal combustion engine includes a cold gas housing, a hot gas housing, and a rotor casing inside which a rotatable cell rotor is disposed. The hot gas housing has a high-pressure exhaust gas duct and a low-pressure exhaust gas duct, while the cold gas housing has a fresh air duct and a charge air duct. The high-pressure exhaust gas duct, the low-pressure exhaust gas duct, the fresh air duct and the charge air duct are fluidically connected to the cell rotor. The hot gas housing has a heat exchanger which is designed in such a way that at least a first bearing for a rotor shaft can be cooled.

19 Claims, 7 Drawing Sheets

(51) Int. Cl.
*F02B 39/00* (2006.01)
*F02B 39/14* (2006.01)

(58) Field of Classification Search
USPC .................................... 123/559.2; 417/64
See application file for complete search history.

(56) References Cited

U.S. PATENT DOCUMENTS

| | | | |
|---|---|---|---|
| 2,800,120 A | 7/1957 | Tihamer Boszormenyi Andre Gabo et al. | |
| 2,836,346 A * | 5/1958 | Boszormenyi | F04F 13/00 123/559.2 |
| 3,078,034 A * | 2/1963 | Spalding | F04F 13/00 417/64 |
| 3,086,697 A * | 4/1963 | Gardiner | F02B 33/42 416/220 R |
| 4,206,607 A * | 6/1980 | Heberle | F02B 33/42 123/559.2 |
| 4,500,260 A * | 2/1985 | Mayer | F02B 33/42 417/64 |
| 6,082,341 A * | 7/2000 | Arai | F02B 33/42 123/559.2 |
| 6,439,209 B1 * | 8/2002 | Wenger | F01N 3/20 123/559.2 |
| 2008/0033628 A1 | 2/2008 | Guzzella et al. | |
| 2010/0206273 A1 | 8/2010 | Guzzella et al. | |
| 2012/0070316 A1 * | 3/2012 | Glitz | F04F 13/00 417/64 |

FOREIGN PATENT DOCUMENTS

| | | |
|---|---|---|
| EP | 0235609 A1 | 9/1987 |
| FR | 1154867 A | 4/1958 |
| GB | 680358 A | 10/1952 |
| GB | 1522299 A | 8/1978 |
| GB | 2479802 A | 10/2011 |

* cited by examiner

PRESSURE WAVE SUPERCHARGER COOLING SYSTEM AND METHOD

CROSS-REFERENCE TO RELATED APPLICATIONS

This application is a 371 U.S. National Stage of International Application No. PCT/EP2015/066977, filed Jul. 24, 2015, which claims priority to European Patent Application No. 14178435.5, filed Jul. 24, 2014 and European Patent Application No. 14180557.2, filed Aug. 11, 2014. The entire disclosures of the above applications are incorporated herein by reference.

The invention relates to a pressure wave supercharger. The invention furthermore relates to a method for operating a pressure wave supercharger.

PRIOR ART

In the case of vehicles operated by means of internal combustion engines, legislation requires increasingly lower pollutant emissions and, in particular, low fuel consumption. Here, the process of converting fuel energy into mechanical energy is subject to the ideal Carnot process, with the result that the efficiency of an internal combustion engine is limited to a maximum of about 40%. The remaining energy contained in the fuel is discharged as lost heat via the engine block of the internal combustion engine or via the exhaust gas. In order to further increase the efficiency of internal combustion engines, internal combustion engines are pressure-charged. In this process, the induced fresh air required for the combustion process is compressed, with the result that a higher volumetric efficiency of the cylinder is achieved during a charge exchange process. The higher proportion of fresh air in the cylinder charge allows a higher feed, e.g. injection of fuel, and thus an increase in the combustion capacity per combustion stroke for the same friction power of the internal combustion engine. This increases the effective power of the internal combustion engine, and therefore it is possible to use an engine with a smaller displacement for the same available power and thus to lower fuel consumption and $CO_2$ emissions.

A pressure wave supercharger is particularly suitable as a compressor for supercharging an internal combustion engine. The pressure wave supercharger of the kind known from document EP0235609A1, for example, uses the energy of the exhaust gas flow, while being in direct gas contact, to compress the induced fresh air and, in the most common design, is constructed with a rotating cell rotor. To achieve an effective increase in the efficiency of the internal combustion engine, it is of central importance that the supercharging process by means of the pressure wave supercharger should likewise take place with a high efficiency.

Known pressure wave superchargers have the disadvantage that the gap between the rotating cell rotor and the fixed parts is of relatively large design in order to avoid mechanical damage to the rotating cell rotor during the operation of the pressure wave supercharger. This relatively large gap results in a reduced efficiency, both during operation but also during cold starting. German Laid-Open Application DE 102012101922A1 discloses a pressure wave supercharger with a reduced gap width. The disadvantage with this device is that it has a tendency to stick, and therefore a reduction in the gap width is no longer possible after the occurrence of sticking.

Documents FR1154867A and U.S. Pat. No. 2,800,120A each disclose a pressure wave supercharger comprising a cold gas housing, a hot gas housing, a rotor casing arranged therebetween and a cell rotor arranged within the rotor casing. The rotor casing comprises two jacket parts, which are mounted in such a way as to be longitudinally movable relative to one another in order to compensate for a change in the length of the cell rotor. This pressure wave supercharger has the disadvantage that the longitudinally movable jacket parts can stick relative to one another, considerably reducing the efficiency of the pressure wave supercharger. Moreover, seals are required and these exhibit wear.

DESCRIPTION OF THE INVENTION

It is an object of the invention to form a pressure wave supercharger that can be operated reliably and has an increased efficiency. It is furthermore an object of the invention to operate a pressure wave supercharger by means of a method such that the pressure wave supercharger can be operated reliably and has an increased efficiency during operation.

This object is achieved by means of a pressure wave supercharger which has the features of claim 1. Dependent claims 2 to 15 relate to further advantageous embodiments. The object is furthermore achieved by means of a method for operating a pressure wave supercharger having the features of claim 16. Dependent claims 17 to 22 relate to further advantageous method steps.

In particular, this object is achieved by means of a pressure wave supercharger for compressing fresh air for an internal combustion engine, comprising a cold gas housing, a hot gas housing, and a rotor casing, which is arranged therebetween, wherein a rotatable cell rotor is arranged within the rotor casing, and wherein the hot gas housing comprises a high-pressure exhaust duct and a low-pressure exhaust duct, and wherein the cold gas housing comprises a fresh air duct and a charge air duct, and wherein the high-pressure exhaust duct, the low-pressure exhaust duct, the fresh air duct and the charge air duct are fluidically connected to the cell rotor, wherein the hot gas housing comprises a first bearing, and the cold gas housing comprises a second bearing, and wherein the cell rotor comprises a rotor shaft, which is mounted in the first and second bearings, wherein the rotor casing is designed as an integral tubular barrel casing, which is connected to the hot gas housing and the cold gas housing, and wherein the hot gas housing comprises a heat exchanger, which is designed in such a way that at least the first bearing can be cooled, wherein the heat exchanger has cooling ducts, which extend within the hot gas housing.

In particular, the object is furthermore achieved by means of a pressure wave supercharger for compressing fresh air for an internal combustion engine, comprising a cold gas housing, a hot gas housing, and a rotor casing, which is arranged therebetween, wherein a rotatable cell rotor is arranged within the rotor casing, and wherein the hot gas housing comprises a high-pressure exhaust duct and a low-pressure exhaust duct, and wherein the cold gas housing comprises a fresh air duct and a charge air duct, and wherein the high-pressure exhaust duct, the low-pressure exhaust duct, the fresh air duct and the charge air duct are fluidically connected to the cell rotor, and wherein the hot gas housing comprises a first bearing, and the cold gas housing comprises a second bearing, and wherein the cell rotor comprises a rotor shaft, which is mounted in the first and second bearings, and wherein the hot gas housing comprises a heat exchanger, which is designed in such a way that at least the first bearing can be cooled.

In particular, the object is furthermore achieved by means of a method for operating a pressure wave supercharger for compressing fresh air for an internal combustion engine, wherein the pressure wave supercharger comprises a cold gas housing, a hot gas housing, and a rotor casing, which is arranged therebetween, wherein a rotatable cell rotor is arranged within the rotor casing, and wherein the hot gas housing comprises a high-pressure exhaust duct and a low-pressure exhaust duct, wherein the cell rotor is supported by the first bearing and by a second bearing arranged in the cold gas housing, wherein the hot gas housing is cooled by a heat exchanger in such a way that a first bearing arranged in the hot gas housing is cooled by virtue of the fact that the first bearing is arranged in a bearing seat and the bearing seat is cooled externally by a cooling liquid.

In particular, the object is furthermore achieved by means of a method for operating a pressure wave supercharger for compressing fresh air for an internal combustion engine, wherein the pressure wave supercharger comprises a cold gas housing, a hot gas housing, and a rotor casing, which is arranged therebetween, wherein a rotatable cell rotor is arranged within the rotor casing, and wherein the hot gas housing comprises one or more high-pressure exhaust ducts and one or more low-pressure exhaust ducts, wherein the hot gas housing is cooled by a heat exchanger in such a way that a first bearing arranged in the hot gas housing is cooled and wherein the cell rotor is supported by the first bearing and by a second bearing arranged in the cold gas housing.

The pressure wave supercharger according to the invention comprises a hot gas housing having a heat exchanger, wherein the heat exchanger is arranged and designed in such a way that it cools at least a first bearing for the cell rotor, said first bearing being arranged in the hot gas housing. In a particularly advantageous embodiment, the high-pressure exhaust gas flow flowing from the internal combustion engine is furthermore cooled in the hot gas housing. The exhaust gas flowing in from the internal combustion engine has an exhaust gas temperature of up to about 1050° C. The cooling of the inflowing exhaust gas flow in the hot gas housing has the effect that the hot gas housing has a relatively low temperature and that the exhaust gas flow flows into the cell rotor at a relatively low temperature, and therefore the cell rotor also has a relatively low operating temperature. Moreover, the cooling of the first bearing has the effect that the cell rotor is additionally cooled by means of the rotor shaft, which is supported in the first bearing, additionally reducing the operating temperature of the cell rotor. This has the effect that both the hot gas housing and the cell rotor and the rotor casing undergo less expansion during heating and less contraction during cooling. The pressure wave supercharger according to the invention has the advantage that the rotor casing can be designed as an integral tubular barrel casing. The rotor casing is manufactured from cast iron, for example. Cooling makes it possible to arrange a first bearing for the cell rotor in the hot gas housing. As a result, it is possible to support the cell rotor in the first bearing, with the result that the end of the cell rotor has a defined position and, as a result, the gap between the end of the cell rotor and the end of the hot gas housing is small and can preferably be kept within a defined range. The cell rotor is supported on both sides, in a first bearing in the hot gas housing and in a second bearing in the cold gas housing. In an advantageous embodiment, the first bearing and/or the second bearing are furthermore lubricated, in particular oil-lubricated or grease-lubricated. The bilateral support for the cell rotor makes it possible to dispense with the previously known cantilevered support of the cell rotor, which had the disadvantage that there was a trumpet-shaped deformation of the rotor at high temperatures and speeds of rotation. The pressure wave supercharger according to the invention has the advantage that trumpet-shaped deformation of the cell rotor no longer occurs or hardly occurs. The pressure wave supercharger according to the invention has the advantage that the cold clearance between the cell rotor and the hot gas housing can be kept extremely small, and the gap width is preferably in a range of from 0.05 to 0.2 mm, preferably about 0.1 mm. By virtue of this small gap width, the pressure wave supercharger according to the invention has the advantage that the cold starting properties are significantly improved since the pressure wave supercharger can produce a sufficiently high boost pressure even during the cold starting phase by virtue of the small gap width. The pressure wave supercharger according to the invention produces a sufficiently high boost pressure even at a temperature in the region of about 200° C., for example.

In a particularly advantageous embodiment, the hot gas housing comprises a bearing seat wall, which is designed as a bearing seat for the first bearing on the side facing the first bearing, wherein the first bearing is arranged in the bearing seat, and wherein the bearing seat wall forms part of a cooling duct outer wall of a cooling duct of the heat exchanger on the side facing away from the first bearing. As a result, a large amount of heat can be dissipated from the first bearing.

In an advantageous embodiment, the cell rotor is of at least two-part design in the direction of extent of the rotor shaft and comprises a first cell rotor part and a second cell rotor part, wherein the cell rotor parts are spaced apart in the direction of extent of the rotor shaft, forming a gap or a rotor gap. The first bearing, which is arranged in the hot gas housing, is cooled. Moreover, the cell rotor is preferably supported in the first bearing in such a way that the end of the cell rotor has a defined position, with the result that the gap between the end of the cell rotor and the end of the hot gas housing can be kept small and preferably does not change owing to temperature changes, wherein heating of the cell rotor has the effect that it undergoes an expansion in length, while the gap between the end of the cell rotor and the end of the hot gas housing remains substantially constant, whereas the width of the rotor gap is reduced. The pressure wave supercharger according to the invention therefore has a high efficiency, even when warm.

The cell rotor is advantageously also supported in the second bearing in such a way that the end of the cell rotor has a defined position, with the result that the gap between the end of the cell rotor and the end of the cold gas housing can be kept small, wherein heating of the cell rotor once again has the effect that the width of the rotor gap is reduced. Heating of the cell rotor during operation thus essentially results in a change in the width of the rotor gap.

In an advantageous embodiment, the cooling capacity of the heat exchanger is controlled in such a way that cooling is performed with only a low cooling capacity or not at all during cold starting to ensure that the pressure wave supercharger reaches the required operating temperature of, for example, about 200° C. in the shortest time possible. Above a certain operating temperature, e.g. above 300° C., the cooling capacity is increased in order to cool the inflowing exhaust gas.

In a particularly advantageous embodiment, the heat exchanger is furthermore designed in such a way that it also cools the exhaust gas flow flowing out of the pressure wave supercharger, preferably by cooling the low-pressure exhaust duct.

A cooling duct advantageously completely surrounds the high-pressure exhaust duct and/or the low-pressure exhaust duct, at least along a cooling section, with the result that the high-pressure exhaust duct and/or the low-pressure exhaust duct are cooled along the entire circumferential surface in the cooling section. Thus, a particularly large amount of heat can be removed from the high-pressure exhaust duct and/or the low-pressure exhaust duct or the gas flowing therein.

The pressure wave supercharger according to the invention has the further advantage that after ignition of unburnt hydrocarbons in the exhaust system no longer occurs or occurs hardly at all since the temperature of the exhaust gas flow fed to the exhaust system and preferably also the temperature of the hot gas housing is significantly reduced. Thus, the exhaust gas flow leaving the hot gas housing can have a temperature of about 700° C. or a temperature of below 700° C., for example. The hot gas housing can have a temperature of about 120° C. at the surface, for example. The heat exchanger is advantageously designed as ducts which extend in the hot gas housing and through which water flows as a cooling medium. A heat exchanger designed in this way is particularly suitable for cooling the hot gas housing, and therefore it is possible to form the hot gas housing from aluminum, an aluminum alloy or a light metal alloy, for example. During operation, a hot gas housing manufactured from such a metal does not suffer any thermal damage since the metal exhibits high heat conduction and the hot gas housing is cooled in such a way that no overheating occurs.

The pressure wave supercharger according to the invention furthermore has the advantage that the volume flow of the exhaust gas is reduced by the cooling of the exhaust gas flow, which has the effect that either the dimensions of the exhaust lines in the pressure wave supercharger can be reduced or that an existing pressure wave supercharger can be operated at an increased exhaust gas delivery capacity.

The pressure wave supercharger according to the invention furthermore has the advantage that it can be constructed with less temperature-stable materials and thus with more advantageous materials, especially the hot gas housing and the cold gas housing but also the cell rotor. In a particularly advantageous embodiment, at least the hot gas housing is made from aluminum, an aluminum alloy or some other light metal alloy in order to form a hot gas housing which is lighter in weight and in order preferably to form a hot gas housing with increased thermal conductivity. A pressure wave supercharger of this kind has the advantage that it is of particularly light design and that the exhaust gas flow can be cooled in a particularly efficient manner. A hot gas housing made from aluminum or a corresponding alloy has the advantage that aluminum has low thermal inertia, with the result that the hot gas housing heats up very quickly and therefore the pressure wave supercharger reaches the required operating temperature in a very short time in the case of a cold start. An internal combustion engine equipped with a pressure wave supercharger according to the invention thus has advantageous cold starting properties. This has the result that the pressure wave supercharger comes into effect very quickly after a cold start, e.g. in the case of a gasoline engine with a small displacement, resulting in better acceleration behavior and lower pollutant emissions, for example. The pressure wave supercharger according to the invention is suitable particularly in combination with gasoline engines, owing to the fact that gasoline engines have high exhaust gas temperatures of up to 1050° C., for example. A diesel engine has lower exhaust gas temperatures.

In a particularly advantageous embodiment, the cell rotor is divided in two and, in the direction of extent of the rotor shaft, comprises a first cell rotor part and then a second cell rotor part, wherein the two cell rotor parts are spaced apart in the direction of extent of the rotor shaft, forming a rotor gap. A cell rotor of this kind is advantageously designed in such a way that heating of the cell rotor parts has the effect that the rotor gap decreases. The rotor gap is preferably arranged in the center of the cell rotor. This embodiment has the advantage that the pressure difference in the center between the first and the second cell rotor part is relatively small, and therefore the loss of efficiency caused by the gap is relatively small. However, the cell rotor could also have a higher number of divisions and could have three, four or five cell rotor parts, for example, between which there would be a rotor gap in each case. However, the rotor gap can also be arranged outside the center of the cell rotor.

The heat exchanger advantageously comprises a water cooling system, in particular such that cooling ducts through which the cooling water flows are arranged in the hot gas housing.

The cell rotor is advantageously driven actively, e.g. by a belt drive, or, in particular, by an electric motor, which is advantageously arranged in the cold gas housing.

BRIEF DESCRIPTION OF THE DRAWINGS

In the drawings used to explain the illustrative embodiments.

In principle, identical parts are provided with identical reference signs in the drawings.

EMBODIMENTS OF THE INVENTION

Figure 1:
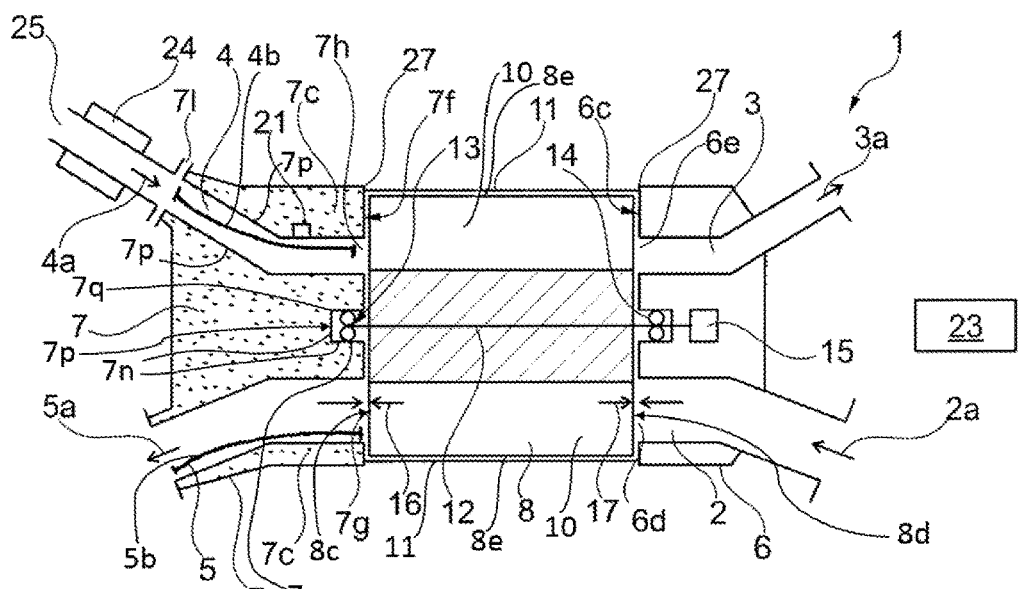
FIG. 1 shows a longitudinal section through a pressure wave supercharger shown partially in schematic form.

FIG. 1 shows schematically a pressure wave supercharger 1 for compressing fresh air 2*a* for an internal combustion engine (not shown), to which compressed fresh air, also referred to as charge air 3*a*, is fed. The pressure wave supercharger 1 comprises a cold gas housing 6, a hot gas housing 7, and a rotor casing 11, which is arranged therebetween, wherein a rotatable cell rotor 8 is arranged within the rotor casing 11. The cell rotor 8 comprises a rotor shaft 12, which is rotatably mounted at the two ends in a first and a second bearing 13, 14, respectively. The first bearing 13 is arranged in the hot gas housing 7, whereas the second bearing 14 is arranged in the cold gas housing 6. The hot gas housing 7 comprises a high-pressure exhaust duct 4 and a low-pressure exhaust duct 5, wherein the high-pressure exhaust gas flow 4a flowing in from the engine is fed to the high-pressure exhaust duct 4, and wherein the low-pressure exhaust gas flow 5a flowing out of the low-pressure exhaust duct 5 is passed to an exhaust. The cold gas housing 6 comprises a fresh air duct 2 and a charge air duct 3. In another embodiment, the cold gas housing 6 could also comprise a plurality of fresh air ducts 2 and a plurality of charge air ducts 3, preferably two in each case. In another embodiment, the hot gas housing 7 could also comprise a plurality of high-pressure exhaust ducts 4 and a plurality of low-pressure exhaust ducts 5, preferably two in each case. The high-pressure exhaust duct 4, the low-pressure exhaust duct 5, the fresh air duct 2 and the charge air duct 3 are fluidically connected to the cell rotor 8 in the arrangement, which is conventional for a pressure wave supercharger but is shown only schematically, wherein the cell rotor 8 comprises rotor cells 10, which form a fluidic connection that is continuous in the direction of extent of the cell rotor 8 and extends from the first end 8c to the second end 8d of the cell rotor 8 in order to compress the induced fresh air 2a with the aid of the high-pressure exhaust gas flow 4a and feed it as charge air 3a to the internal combustion engine. At the end 7f facing the cell rotor 8, the hot gas housing 7 has an inlet opening 7h and an outlet opening 7g. Between this end 7f and the cell rotor 8, there is a gap 16. Gap 16 preferably has a width in a range of from 0.05 to 0.2 mm and, in particular, a width of about 0.1 mm. At the end 6c facing the cell rotor 8, the cold gas housing 6 has an inlet opening 6d and an outlet opening 6e. Between this end 6c and the cell rotor 8 there is a gap 17. The cell rotor 8 has a cell rotor outer wall 8e, which delimits the rotor cells 10.

The hot gas housing 7 comprises a heat exchanger 7c (illustrated in partially schematic form), wherein the heat exchanger 7c is designed in such a way that at least the first bearing 13 is cooled. The hot gas housing 7 advantageously comprises a bearing seat wall 7n, which, on the side facing the first bearing 13, is designed as a bearing seat 7o for the first bearing 13, wherein the first bearing 13 is arranged in the bearing seat 7o, and wherein, on the side facing away from the first bearing 13, the bearing seat wall 7n forms part of a cooling duct outer wall 7p of a cooling duct 7d of the heat exchanger 7c.

The heat exchanger 7c is particularly advantageously designed in such a way that the high-pressure exhaust duct 4 can also be cooled, and hence the high-pressure exhaust gas flow 4a flowing through the high-pressure exhaust duct 4 is cooled. The heat exchanger 7c advantageously comprises a cooling duct 7e, which completely surrounds the high-pressure exhaust duct 4, at least along a cooling section 4b, with the result that the outer wall of the high-pressure exhaust duct 4 simultaneously forms part of the cooling duct outer wall 7p.

The cooling flow is preferably guided in the heat exchanger 7c in such a way that the coolant first of all cools the first bearing 13 and is then fed to the high-pressure exhaust duct 4 in order to cool the latter. The coolant preferably flows in cooling ducts which are situated in the outer wall of the high-pressure exhaust duct 4. In another advantageous embodiment, the heat exchanger 7c is embodied in such a way that the low-pressure exhaust duct 5 can furthermore also be cooled, with the result that the low-pressure exhaust gas flow 5a flowing through said duct is cooled. Water is preferably used as the coolant. In an advantageous embodiment, the cooling ducts are connected to the water circuit of an internal combustion engine, and therefore said circuit delivers the cooling water and effects circulation. In the illustrative embodiment shown, the rotor shaft 12 is driven by an electric motor 15 arranged in the cold gas housing 6. The rotor shaft 12 could also be driven by a belt drive, for example.

In an advantageous embodiment, a sensor 21 is arranged in the pressure wave supercharger 1 for the purpose of detecting the temperature of the high-pressure exhaust gas flow 4a, the temperature of the low-pressure exhaust gas flow 5a, or a variable connected therewith, wherein the sensor 21 is connected for signal transmission to a control device 23. The heat exchanger 7c is fluidically connected to a heat dissipation device (not shown), with the result that a water circuit is formed, which also includes a circulating pump (not shown). In a preferred embodiment, the circulating pump can be controlled by the control device 23, thus allowing the cooling capacity of the heat exchanger 7c to be controlled, preferably as a function of a temperature measured by the sensor 21.

In an advantageous method, there is no cooling or only reduced cooling of the heat exchanger 7c during a cold start, and therefore there is no cooling or only reduced cooling during an initial starting phase S1 until the pressure wave supercharger 1, in particular the high-pressure exhaust gas flow or the low-pressure exhaust gas flow, has a minimum temperature $T_{min}$, and the cooling capacity of the heat exchanger 7c is then increased. This method has the advantage that the pressure wave supercharger is heated up quickly during the cold start and therefore quickly produces the required compression power. In another advantageous method, the cooling capacity of the heat exchanger during a cold start is reduced in a predetermined starting time period $T_{st}$, or the heat exchanger 7c is switched off, and the cooling capacity of the heat exchanger 7c is increased on expiry of the starting time period $T_{st}$.

Figure 2:
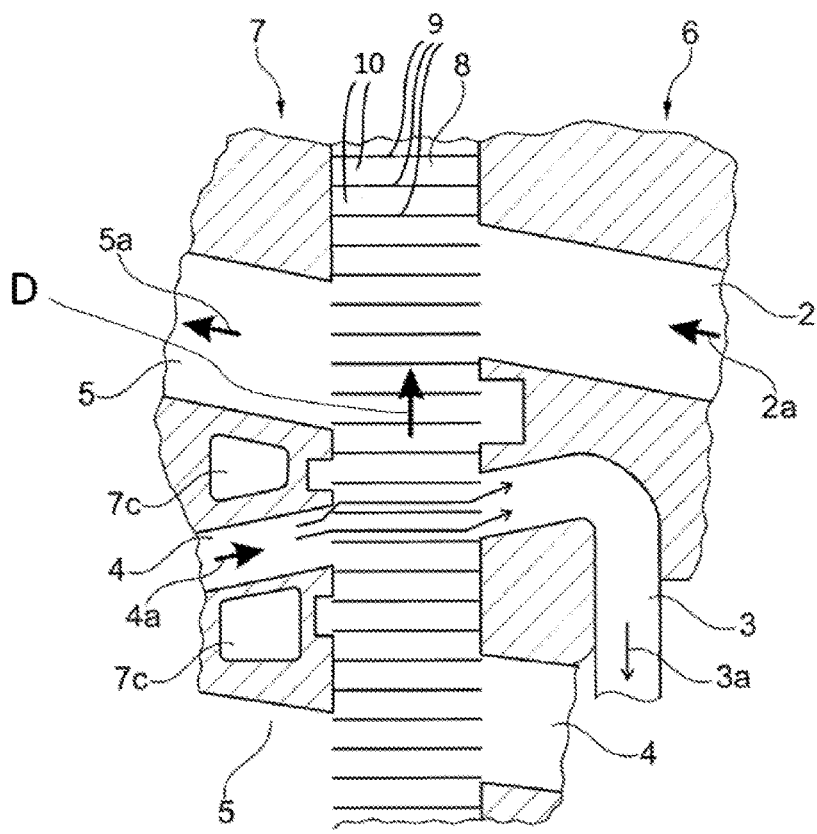
FIG. 2 shows a basic illustration of the gas routing in the cell rotor.

FIG. 2 shows, in a basic illustration, the gas routing in a pressure wave supercharger having a cell rotor 8. The cell rotor 8 is mounted so as to be rotatable in direction of rotation D. The cell rotor 8 comprises a plurality of cell walls 9, which are arranged spaced apart in direction of rotation D and which delimit rotor cells 10. As shown in FIG. 1, the cell rotor 8 or rotor cells 10 end in the direction of extent at a first and a second end 8c, 8d, respectively. The cell rotor 8 or rotor cells 10 are of continuous design in the direction of extent of the cell rotor 8 or of the rotor shaft 12 in order to form a continuous, unhindered fluidic connection between the first and the second end 8c, 8d in the direction of extent of the cell rotor 8 or of the rotor shaft 12. Induced fresh air 2a flows into the rotating cell rotor 8 through the fresh air duct 2, and the exhaust gas 4a coming from the combustion stroke flows into the rotating cell rotor 8 through the high-pressure exhaust duct 4. The induced fresh air 2a is compressed by the pressure of the exhaust gas 4a and subsequently fed to the internal combustion engine on an intake side via the charge air duct 3, and then flows into the cylinder in which a charge exchange process is taking place and is mixed there with fuel and burnt. Following this, the exhaust gas 4a is once again fed to the pressure wave supercharger 1 via the high-pressure exhaust duct 4. After the compression of the fresh air 2a by the exhaust gas 4a, the exhaust gas 5a which is no longer required is released into a low-pressure exhaust duct 5 by the cell rotor 8 and fed to the further exhaust line.

In the hot gas housing 7 there is a high-pressure exhaust duct 4, which is fed to the cell rotor 8. Also arranged in the hot gas housing 7 is a heat exchanger 7c, which, in the illustrative embodiment shown, is embodied as water ducts 7d, which surround the high-pressure exhaust duct 4 in order to cool the inner walls thereof and in order thereby to cool the high-pressure exhaust gas flow 4a flowing through. In the illustrative embodiment shown, the heat exchanger 7c or water ducts 7d is/are part of the hot gas housing 7. In a preferred embodiment, which is not shown, the water ducts 7d are first of all routed to that region of the hot gas housing 7 in which the first bearing 13 is arranged in order first of all to cool the first bearing 13 before that part of the hot gas housing 7 which surrounds the high-pressure exhaust duct 4 is cooled. In an advantageous embodiment (not shown), a heat exchanger 7c, in particular water ducts 7d, could be arranged in the region of the low-pressure exhaust duct 5 in order to cool the low-pressure exhaust gas flow 5a.

Figure 3:
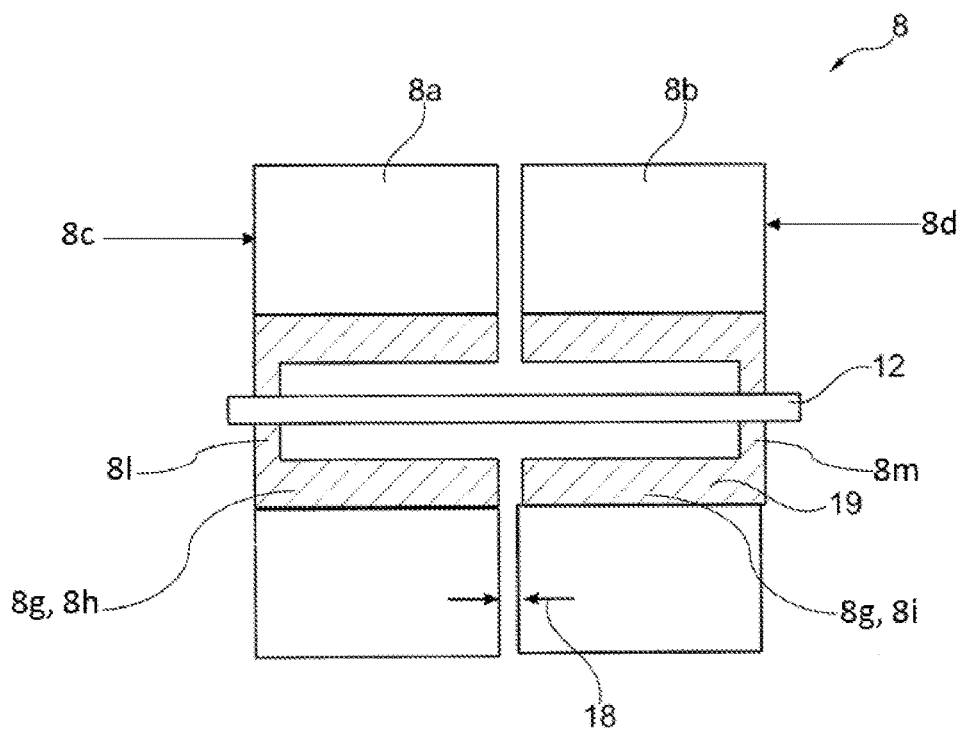
FIG. 3 shows a longitudinal section through a divided cell rotor.

FIG. 3 shows a first illustrative embodiment of a cell rotor 8, which is of two-part design in the direction of extent of the rotor shaft 12 and comprises a first cell rotor part 8a having a first bearing part 8h and a second cell rotor part 8b having a second bearing part 8i, wherein the two cell rotor parts 8a, 8b and the two bearing parts 8h, 8i form a gap 18 relative to one another, with the result that the two cell rotor parts 8a, 8b are spaced apart, forming a gap 18. The rotor cells 10, which extend continuously between the first and the second end 8c, 8d, are likewise spaced apart by the gap 18 at the transition between the first and the second cell rotor part 8a, 8b, wherein the gap 18 does not hinder the fluid flow in the rotor cell 10, which extends continuously from the first to the second end 8c, 8d. Both cell rotor parts 8a, 8b are connected to one another by the rotor shaft 12 and rotate in the same direction of rotation D. At their end sections 8l, 8m, the bearing parts 8h, 8i are connected in a fixed manner to the rotor shaft 12. Heating of the cell rotor 8 has the effect that the cell rotor parts 8a, 8b expand, with the result that gap 18 decreases. Cooling of the cell rotor 8 has the effect that gap 18 increases. The embodiment shown in FIG. 3 has the advantage that the gap 16 between the end 7f of the hot gas housing 7 and the first cell rotor part 8a remains constant or substantially constant during the operation of the pressure wave supercharger 1, irrespective of the temperature of the cell rotor part 8a, since the change in the length of the cell rotor part 8a resulting from the heating has an effect as regards the width of gap 18. In an advantageous embodiment, the width of gap 18 in the cold state of the cell rotor 8 is 0.4 mm, wherein this width decreases during the operation of the pressure wave supercharger 1 to a value of, preferably, below 0.2 mm owing to the heating of the cell rotor 8. In a particularly advantageous embodiment, gap 18 closes completely owing to the heating. During cooling of the cell rotor 8, gap 18 increases again up to the cold state.

Figure 4:
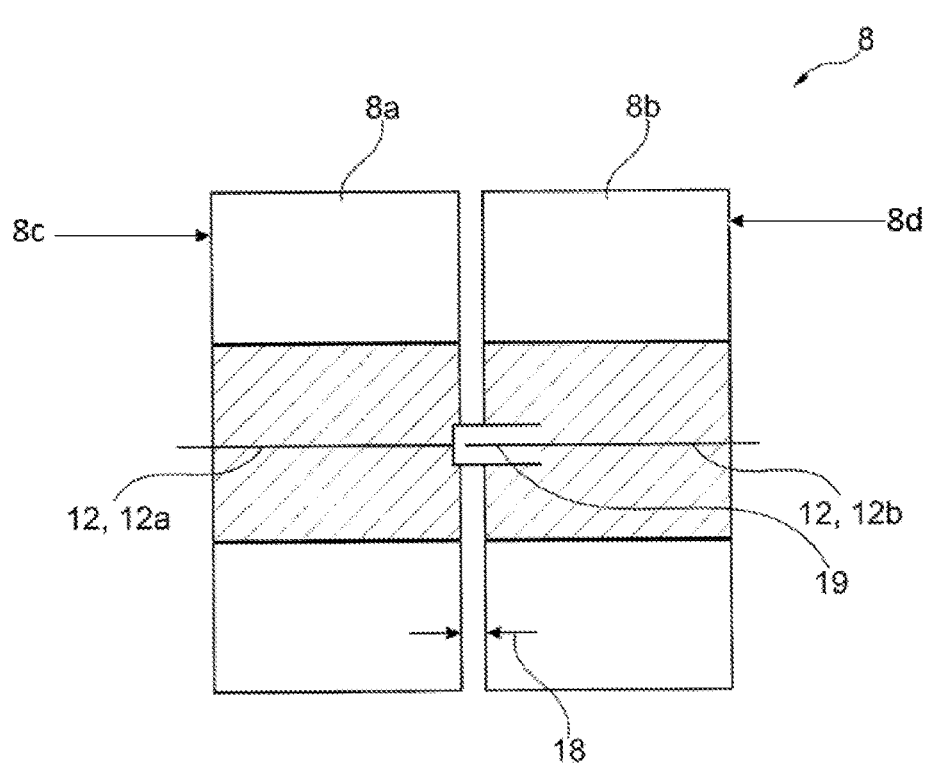
FIG. 4 shows a longitudinal section through another illustrative embodiment of a divided cell rotor.

FIG. 4 shows another illustrative embodiment of a cell rotor 8, which is of at least two-part design in the direction of extent of the rotor shaft 12 and comprises a first cell rotor part 8a having a first rotor shaft section 12a and a second cell rotor part 8b having a second rotor shaft section 12b, wherein the two cell rotor parts 8a, 8b or the two rotor shaft sections 12a, 12b are connected to one another by means of a coupling 19. The two cell rotor parts 8a, 8b have a rotor gap 18. The two rotor shaft sections 12a, 12b are mounted in such a way that they can be moved relative to one another in the coupling 19, allowing a change in the temperature of the cell rotor 8 to result in a change in the gap width 18.

Figure 5:
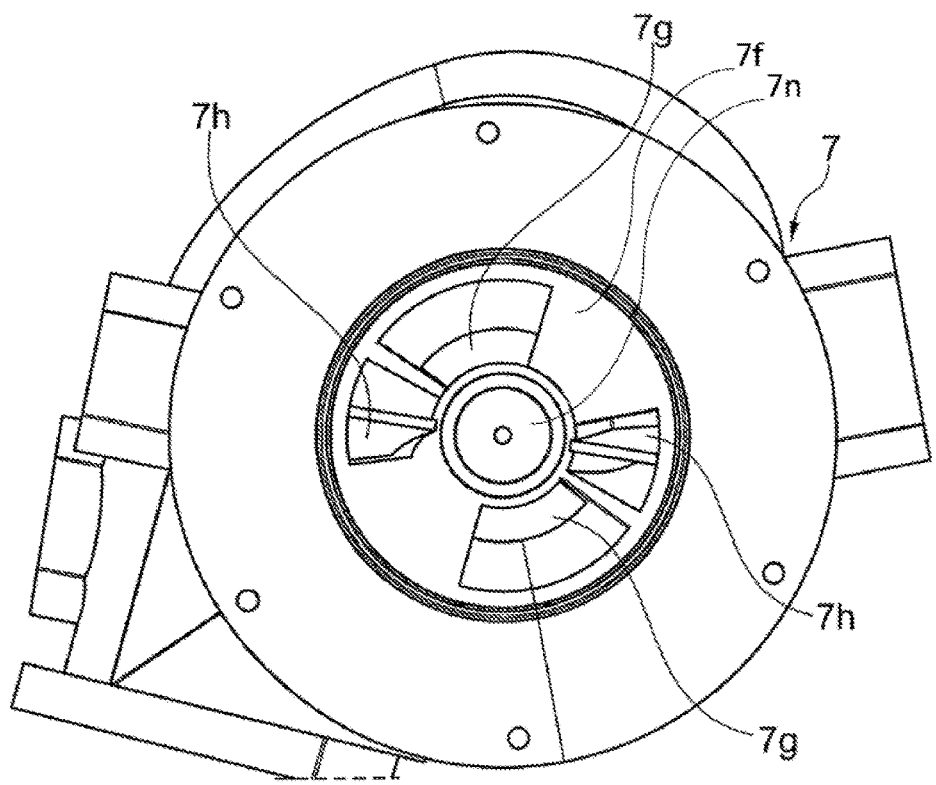
FIG. 5 shows a front view of a hot gas housing.

FIG. 5 shows the end 7f of a hot gas housing 7, wherein, in succession, an inlet opening 7h and, following this, an outlet opening 7g are arranged on the end 7f, spaced apart in the circumferential direction, wherein, following this, once again, an inlet opening 7h and, following the latter, an outlet opening 7g are arranged. A pressure wave supercharger 1 comprising the hot gas housing 7 shown in FIG. 5 is embodied in such a way that it has a gas conduit which consists of two gas conduits arranged one above the other, as shown in FIG. 2.

Figure 6:
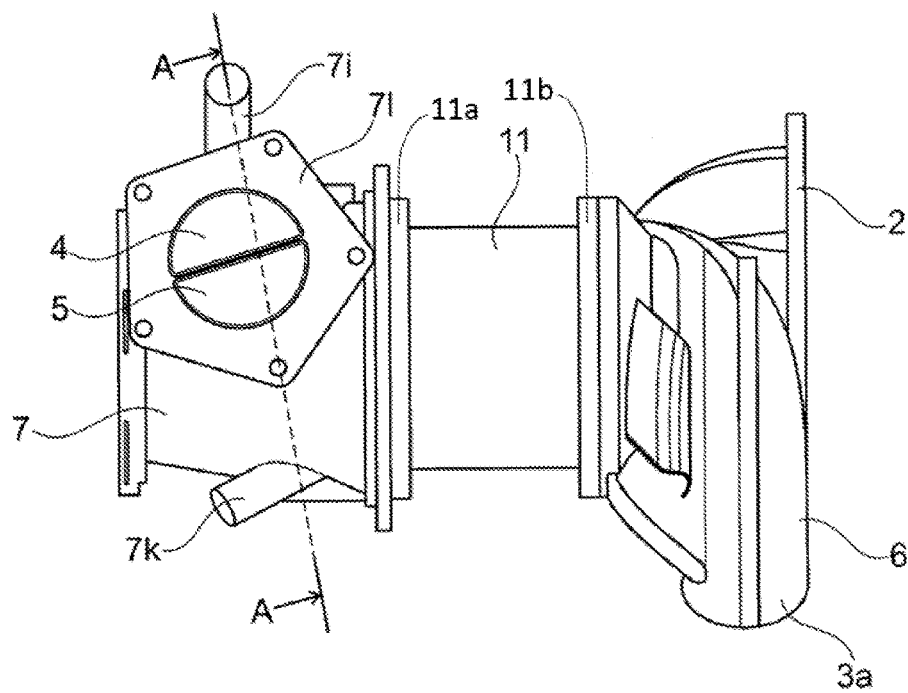
FIG. 6 shows a side view of a pressure wave supercharger.
Figure 7:
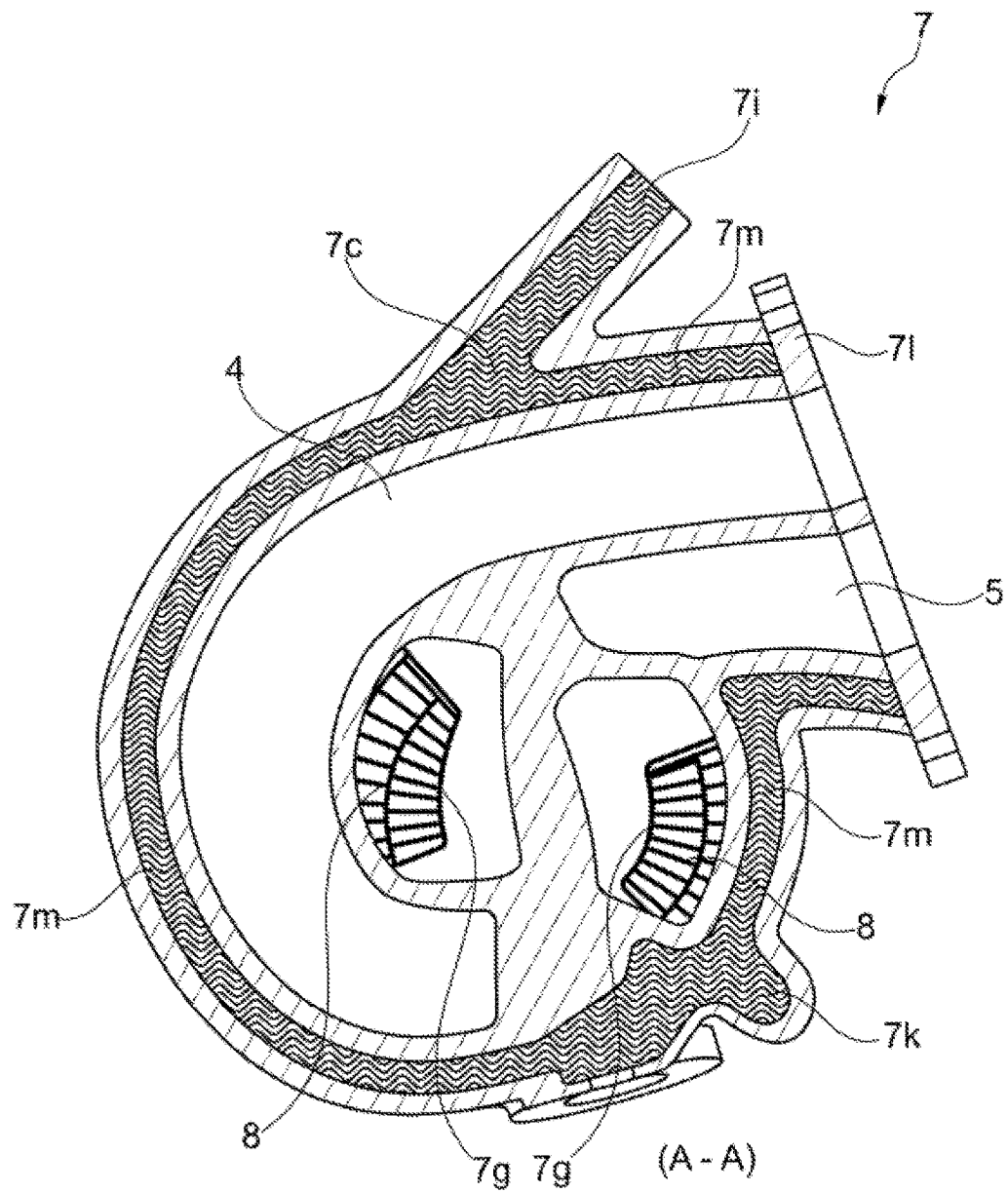
FIG. 7 shows a section through the pressure wave supercharger along section line A-A shown in FIG. 6.

FIG. 6 shows, in a side view, another illustrative embodiment of a pressure wave supercharger 1 having a hot gas housing 7, rotor casing 11 and cold gas housing 6, wherein the hot gas housing 7 comprises a flange 7l, at which the high-pressure exhaust duct 4 and the low-pressure exhaust duct 5 emerge. The rotor casing 11 has two flanges 11a, 11b, which are secured on the hot gas housing 7 and on the cold gas housing 6, respectively. Also shown are a cooling water inlet 7i and a cooling water outlet 7k, via which cooling water exchange with the heat exchanger 7c arranged in the hot gas housing 7 takes place. FIG. 7 shows a section through FIG. 6 along the section line A-A. The high-pressure exhaust duct 4 and the low-pressure exhaust duct 5 are at least partially surrounded by a water jacket 7m, which is situated within the heat exchanger 7c, wherein the water is exchanged via the inlet and outlet lines 7i, 7k and is cooled outside the hot gas housing 7. The hot gas housing 7 is preferably of double-walled design in some section or sections in order to form the heat exchanger 7c between the spaced walls. The two outlet openings 7g and part of the cell rotor 8, arranged behind them, and the rotor cells of said rotor can furthermore be seen in FIG. 7.

The cooling device comprising the heat exchanger 7c can be embodied in various ways and could also be embodied as a steam circuit with heat pipes and a steam circuit involving a phase change, for example.

Figure 8:
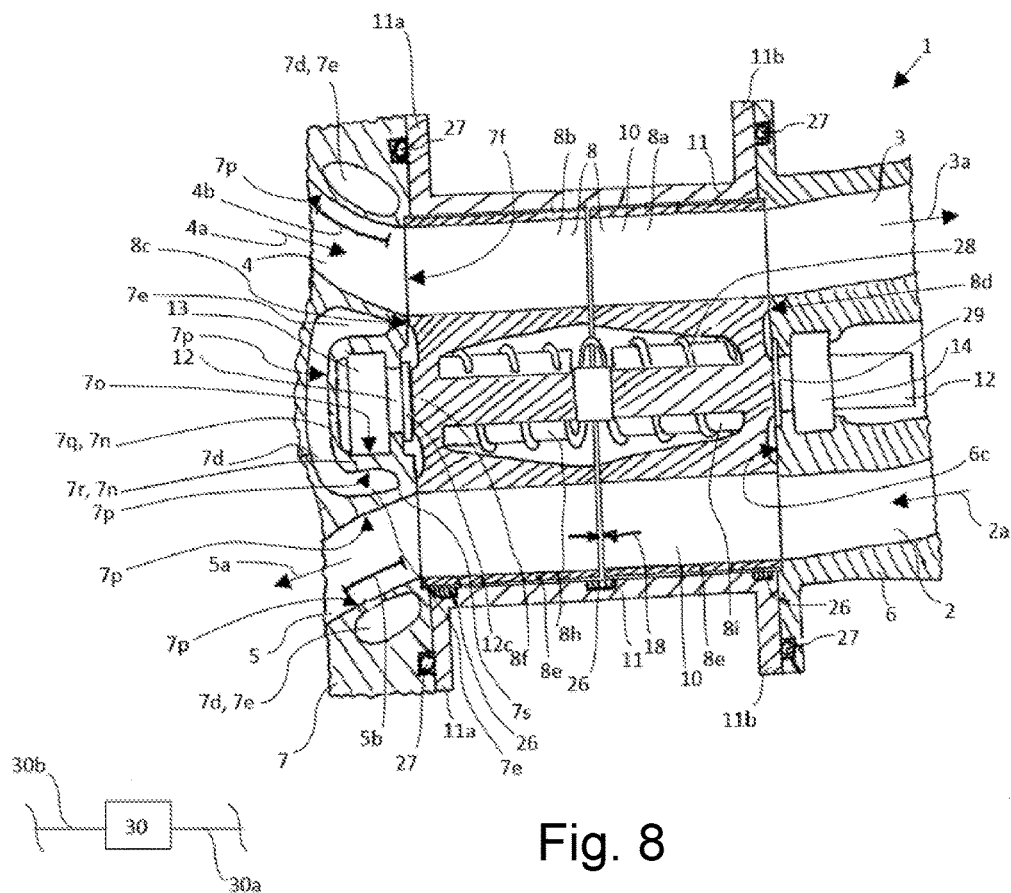
FIG. 8 shows a longitudinal section through another illustrative embodiment of a pressure wave supercharger.

The cooling of the pressure wave supercharger 1 has the effect that said charger has a relatively low temperature during operation. This results in the advantage that, as shown in FIG. 8, sealing rings 27 or O-rings can be used for sealing between the cold housing 6 and the rotor casing 11 and/or between the hot gas housing 7 and the rotor casing 11, wherein the sealing rings 27 are composed of metal or plastic, preferably from a permanently flexible material, such as silicone. The sealing ring 27 extends over 360 degrees in the circumferential direction.

As shown in FIG. 1, it may furthermore prove advantageous to arrange an additional heat exchanger 24 in order to cool a high-pressure exhaust feed line 25, wherein the high-pressure exhaust feed line 25 is arranged upstream of the high-pressure exhaust duct 4 in the exhaust gas flow direction.

FIG. 8 shows, in a longitudinal section, another illustrative embodiment of a pressure wave supercharger 1 having a divided, rotatably mounted cell rotor 8. The rotor casing 11 is embodied as an integral, tubular barrel casing and is connected by flanges 11a, 11b to the hot gas housing 7 and the cold gas housing 6. The hot gas housing 7 is manufactured from aluminum or a light metal alloy. The rotor shaft 12 is of continuous design and is rotatably mounted in the first bearing 13 and in the second bearing 14. A collar 12c is connected in a fixed manner to the rotor shaft 12. The first and the second cell rotor part 8a, 8b are mounted so as to be movable on the rotor shaft 12 by means of bearing parts 8h, 8i. A spring 28 gives rise to a repulsive force, ensuring that the two cell rotor parts 8a, 8b rest under a preload against the collar 12c or a stop washer 29.

Figure 9:
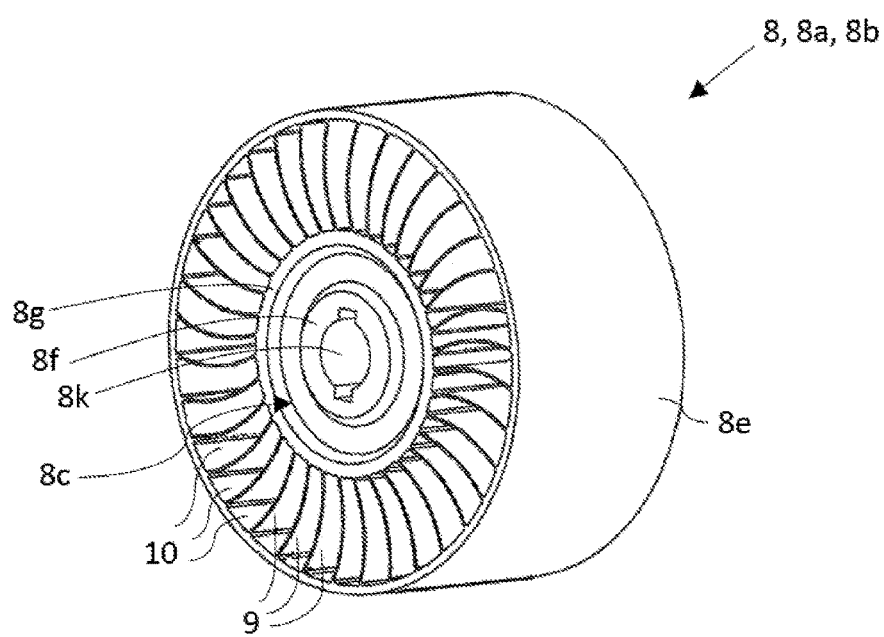
FIG. 9 shows a perspective view of the front side of a cell rotor.
Figure 10:
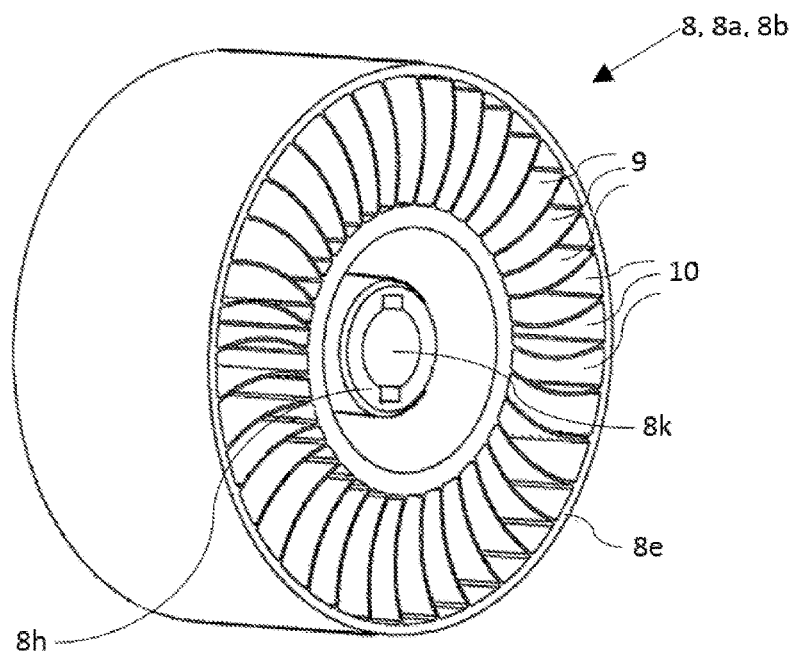
FIG. 10 shows a perspective view of the rear side of a cell rotor.

FIGS. 9 and 10 show, in a perspective view, the front side and rear side, respectively, of the cell rotor parts 8a, 8b shown in FIG. 8. The two cell rotor parts 8a, 8b are of identical design. The cell rotor part 8a, 8b comprises a cell rotor outer wall 8e, a cell rotor inner wall 8g and a multiplicity of cell walls 9, with the result that rotor cells 10 are formed. The cell rotor part 8a, 8b furthermore comprises a first end 8c comprising a stop 8f and an aperture 8k for the rotor shaft 12. The cell rotor part 8a, 8b furthermore comprises a bearing part 8h.

The two cell rotor parts 8a, 8b rest via the stop 8f against the collar 12c or against the stop washer 29, wherein these are arranged in a manner appropriate to ensure that a gap 16 with a defined gap width is obtained between the first end 8c of the first cell rotor part 8a and the end 7f of the hot gas housing 7, and wherein these are arranged in a manner appropriate to ensure that a gap 17 with a defined gap width is obtained between the second end 8d of the second cell rotor part 8b and the end 6c of the cold gas housing 6. A change in the temperature in the pressure wave supercharger 1 thus has the effect that the width of the rotor gap 18 changes, whereas the width of gaps 16 and 17 remains constant or substantially constant, irrespective of the temperature. This is one reason why the pressure wave supercharger 1 has a high efficiency.

However, the pressure wave supercharger 1 shown in FIG. 8 could also be of integral design, i.e. without a rotor gap 18, as shown in FIG. 1, for example.

In the hot gas housing 7, the pressure wave supercharger 1 shown in FIG. 8 comprises a heat exchanger 7c, which is embodied in such a way that at least the first bearing 13 can be cooled, wherein the heat exchanger 7c has cooling ducts 7d, which extend within the hot gas housing 7. The hot gas housing 7 comprises a bearing seat wall 7n, which is designed as a bearing seat 7o for the first bearing 13 on the side facing the first bearing 13, wherein the first bearing 13 is arranged in the bearing seat 7o, and wherein, on the side facing away from the first bearing 13, the bearing seat wall 7n forms part of a cooling duct outer wall 7p of a cooling duct 7d of the heat exchanger 7c. The bearing seat wall 7n advantageously comprises an end 7q and, starting from the end 7q, a bearing section 7r in the form of a hollow cylinder, wherein the end 7q and the bearing section 7r form the bearing seat 7o, and wherein both the end 7q and the bearing section 7r in the form of a hollow cylinder form part of the cooling duct outer wall 7p. This embodiment is particularly advantageous because heat flow from the hot gas housing 7 to the bearing seat 7o is greatly reduced. Introduction of heat from the first bearing 13 to the cell rotor 8 is thereby advantageously prevented. The bearing seat 7o is particularly advantageously cooled to such a great extent that heat can furthermore be dissipated from the cell rotor 8 via the first bearing 13. In this way, the cell rotor 8 can be cooled in a particularly advantageous manner. The bearing seat wall 7n is advantageously connected via a thin portion 7s or a bridge to the remainder of the hot gas housing 7 in order to reduce heat flow from the remainder of the hot gas housing to the bearing seat wall 7n.

In an advantageous embodiment, the pressure wave supercharger 1, if it has a divided rotor 8, comprises a plurality of labyrinth seals 26, as shown by way of example and schematically in FIG. 8. The labyrinth seals 26 are arranged on the inside of the rotor casing 11 and/or on the outside of the cell rotor outer wall 8e, for example, wherein only the labyrinth seals 26 arranged on the rotor casing 11 are shown in FIG. 8. The labyrinth seals 26 extend over 360° in the circumferential direction, wherein the labyrinth seals 26 are shown only at the bottom of the rotor casing 11 in FIG. 8, for the sake of simplicity. However, the labyrinth seals 26 would also extend at the top in the rotor casing 11. The labyrinth seal 26 is advantageously arranged at least in the region of gap 18 in order to avoid fluid escaping from the rotor cell 10 through gap 18 in the region between gap 18 and the rotor casing 11. Two labyrinth seals 26, each extending over 360° in the circumferential direction, are furthermore advantageously arranged in the end region of the cell rotor 8, as shown in FIG. 8, in order to avoid fluid penetrating into the gap between the cell rotor outer wall 8e and the inside of the rotor casing 11.

The heat exchanger 7c advantageously has a cooling duct 7e, which completely surrounds the high-pressure exhaust duct 4, at least along a cooling section 4b, with the result that the outer wall of the high-pressure exhaust duct 4 simultaneously forms part of the cooling duct outer wall 7p. As shown in FIG. 8, the thin portion 7s or the bridge particularly advantageously forms a cooling duct outer wall 7p on both sides, additionally reducing heat flow from the remainder of the hot gas housing to the bearing seat wall 7n.

The heat exchanger 7c furthermore advantageously has a cooling duct 7e, which completely surrounds the low-pressure exhaust duct 5, at least along a cooling section 5b, with the result that the outer wall of the low-pressure exhaust duct 5 simultaneously forms part of the cooling duct outer wall 7p.

In an advantageous embodiment, an oil circuit 30 comprising oil lines 30a can furthermore be provided in order to supply the first and/or the second bearing 13, 14 with oil, although the oil lines required for this purpose extending in the hot gas housing 7 and/or in the cold gas housing 6 are not shown in FIG. 8.

Figure 11:
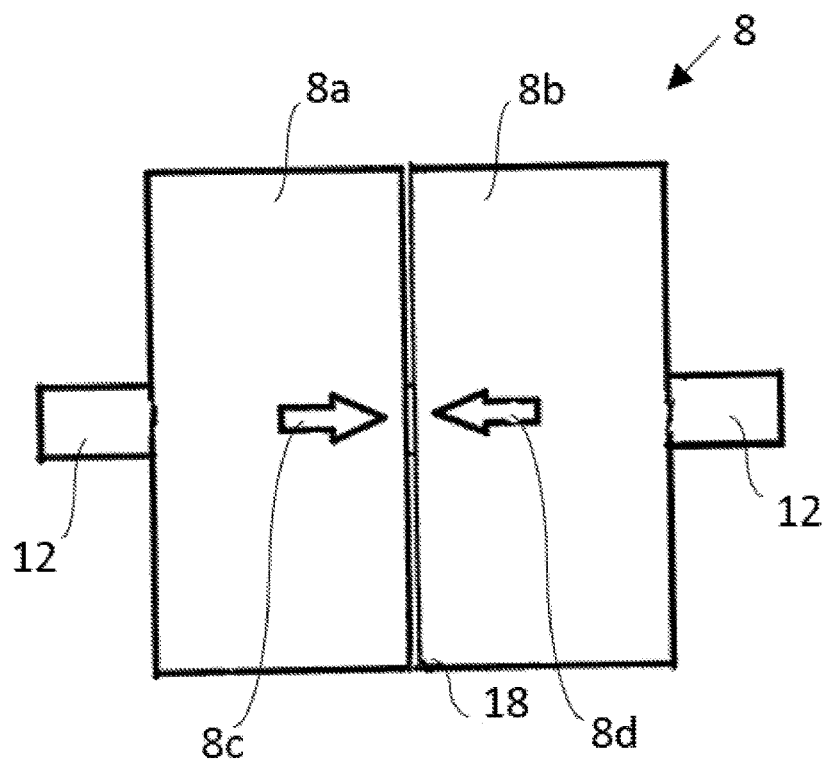
FIG. 11 shows a side view of a divided cell rotor.

FIG. 11 shows a side view of a divided cell rotor 8, which is of two-part design in the direction of extent of the rotor shaft 12 and has a first cell rotor part 8a and a second cell rotor part 8b. The cell rotor parts 8a, 8b are connected to the rotor shaft 12 in such a way that they undergo an expansion movement 8c, 8d only toward the center when heated, resulting in a reduction in the gap width 18. The position of the cell rotor parts 8a, 8b on the rotor shaft 12 relative to the end of the cell rotor 8 preferably does not change, and therefore a constant or substantially constant gap width between the end face of the hot gas housing and the cell rotor is ensured.

Figure 12:
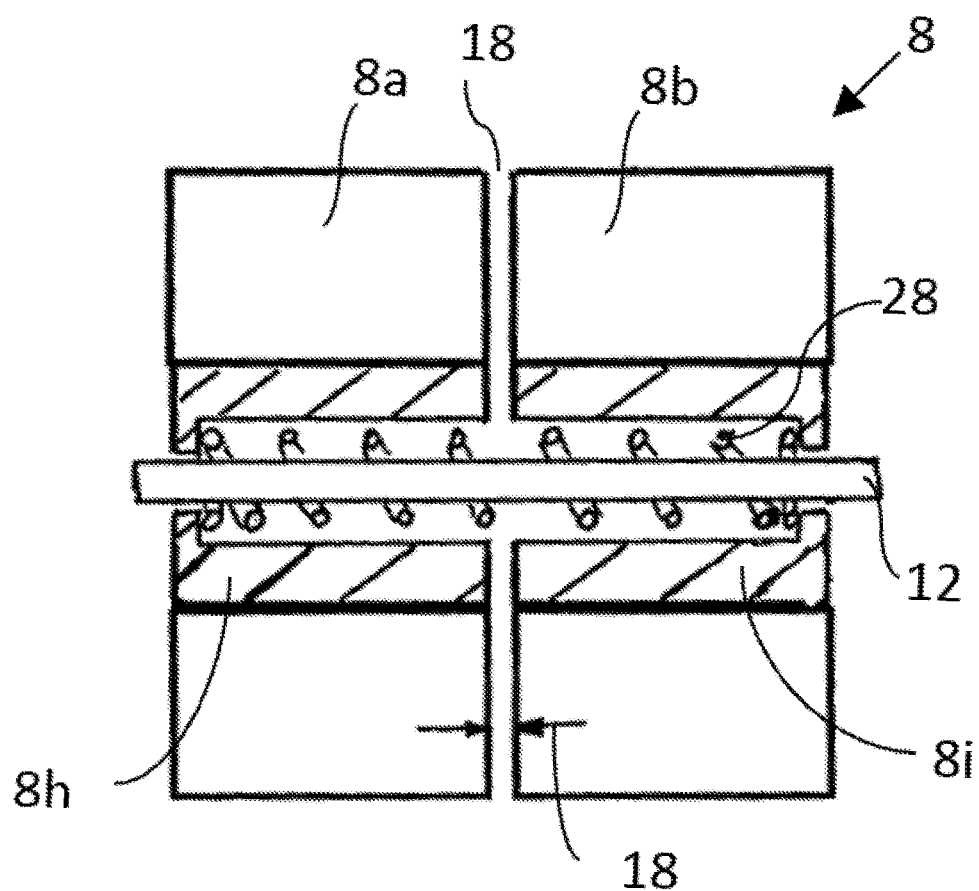
FIG. 12 shows a longitudinal section through a divided cell rotor.

FIG. 12 shows a cell rotor 8 comprising a first cell rotor part 8a having a first bearing part 8h and a second cell rotor part 8b having a second bearing part 8i, wherein the two cell rotor parts 8a, 8b and the two bearing parts 8h, 8i form a gap 18 relative to one another. The bearing parts 8h, 8i are mounted so as to be movable relative to the rotor shaft 12. The bearing parts 8h, 8i have an aperture, within which a stressed spring 28 is arranged, which pushes the two bearing parts 8h, 8i and hence the two cell rotor parts 8a, 8b away from one another, with the result that the cell rotor parts 8a, 8b almost rest by means of the ends thereof on the end 7f of the hot gas housing 7 and on the end 6c of the cold gas housing 6, respectively, with the result that only a small gap 16, 17 is formed therebetween. Heating of the cell rotor 8 has the effect that the cell rotor parts 8a, 8b expand, with the result that gap 18 decreases. Cooling of the cell rotor 8 has the effect that gap 18 increases. The embodiment shown in FIG. 12 has the advantage that the gap 16 between the end 7f of the hot gas housing 7 and the first cell rotor part 8a remains constant or substantially constant, irrespective of the temperature of the cell rotor part 8a, since the change in the length of the cell rotor part 8a owing to the heating has an effect in respect of the width of gap 18.

In an advantageous embodiment, the first cell rotor part 8a is composed of a material which is more resistant to heat than the second cell rotor part 8b. During the operation of the pressure wave supercharger 1, the first cell rotor part 8a could have a temperature of about 800° C., for example, whereas the second cell rotor part 8*b* has a temperature of only about 200° C. Gap 18 prevents continuous heat conduction in the direction of extent of the cell rotor 8, with the result that the cell rotor parts 8*a*, 8*b* can have widely differing temperatures. It is therefore also possible to manufacture the second cell rotor part 8*b* from a material of reduced heat resistance, even from a plastic, for example. A cell rotor 18 of this kind is less expensive and preferably also lighter.

In an advantageous method for operating the pressure wave supercharger, the hot gas housing 7 is cooled by a heat exchanger 7*c* in such a way that a first bearing 14 arranged in the hot gas housing 7 is cooled by virtue of the fact that the first bearing 15 is arranged in a bearing seat 7*o* and that the bearing seat 7*o* is cooled externally by a cooling liquid.

The exhaust gas flow 4*a* of the internal combustion engine flowing through the high-pressure exhaust duct 4 is advantageously cooled. A cooling duct 7*e* advantageously completely surrounds the high-pressure exhaust duct 4, at least along the cooling section 4*b*, with the result that the high-pressure exhaust duct 4 is cooled along the entire circumferential surface in the cooling section 4*b*.

In an illustrative method, the exhaust gas temperature emerges from the gasoline engine at about 1050° C., is cooled in the high-pressure exhaust duct 4 and enters the cell rotor at about 850° C. The cell rotor is furthermore cooled by the entering fresh air 2*a*, which is at about 20° C., with the result that the cell rotor has a temperature of about 450° C.

The invention claimed is:

1. A pressure wave supercharger for compressing fresh air for an internal combustion engine, comprising:
   a cold gas housing, a hot gas housing, and a rotor casing, which is arranged therebetween;
   wherein a rotatable cell rotor is arranged within the rotor casing;
   wherein the hot gas housing includes a high-pressure exhaust duct and a low-pressure exhaust duct;
   wherein the cold gas housing includes a fresh air duct and a charge air duct;
   wherein the high-pressure exhaust duct, the low-pressure exhaust duct, the fresh air duct and the charge air duct are fluidically connected to the cell rotor;
   wherein the hot gas housing includes a first bearing, and the cold gas housing includes a second bearing;
   wherein the cell rotor comprises a rotor shaft, which is mounted in the first and second bearings;
   the rotor casing is an integral tubular barrel casing, which is connected to the hot gas housing and the cold gas housing;
   the hot gas housing includes a heat exchanger for cooling at least the first bearing;
   wherein the heat exchanger has cooling ducts, which extend within the hot gas housing;
   wherein the hot gas housing comprises a bearing seat wall, which, on the side facing the first bearing, has a bearing seat of the first bearing, wherein the first bearing is arranged in the bearing seat, and, on a side facing away from the first bearing, the bearing seat wall forms part of a cooling duct outer wall of a cooling duct of the heat exchanger;
   wherein the bearing seat wall has an end and, starting from the end, a bearing section in the form of a hollow cylinder, wherein the end and the bearing sections forms the bearing seat, and wherein both the end and the bearing section are in the form of a hollow cylinder and form part of the cooling duct outer wall; and
   wherein the end and the bearing section surround an axial end of the first bearing on three sides.

2. The pressure wave supercharger as claimed in claim 1, wherein the heat exchanger has a cooling duct, which completely surrounds the high-pressure exhaust duct, at least in some section or sections, with the result that the outer wall of the high-pressure exhaust duct simultaneously forms part of the cooling duct outer wall.

3. The pressure wave supercharger as claimed in claim 2, wherein the heat exchanger has a cooling duct which completely surrounds the low-pressure exhaust duct, at least in some section or sections, with the result that the outer wall of the low-pressure exhaust duct simultaneously forms part of the cooling duct outer wall.

4. The pressure wave supercharger as claimed in claim 1, wherein the heat exchanger is designed in such a way that the high-pressure exhaust duct can be cooled, wherein the first bearing is cooled first and then the high-pressure exhaust duct.

5. The pressure wave supercharger as claimed in claim 1, wherein the heat exchanger is designed in such a way that the low-pressure exhaust duct can also be cooled.

6. The pressure wave supercharger as claimed in claim 1, wherein the heat exchanger comprises a water circuit for cooling.

7. The pressure wave supercharger as claimed in claim 1, wherein an additional heat exchanger cools a high-pressure exhaust feed line, wherein the high-pressure exhaust feed line is arranged upstream of the high-pressure exhaust duct in the exhaust gas flow direction.

8. The pressure wave supercharger as claimed in claim 1, wherein at least the first bearing or the second bearing is designed as a rolling bearing.

9. The pressure wave supercharger as claimed in claim 1, wherein at least the first bearing has an oil or grease lubrication system.

10. The pressure wave supercharger as claimed in claim 7, wherein the hot gas housing comprises an oil circuit, which supplies the first bearing with oil.

11. The pressure wave supercharger as claimed in claim 1, wherein the cell rotor is of at least two-part design in the direction of extent of the rotor shaft and comprises a first cell rotor part and a second cell rotor part, wherein the two cell rotor parts are spaced apart in the direction of extent of the rotor shaft.

12. The pressure wave supercharger as claimed in claim 1, wherein a sealing ring for sealing is arranged between the cold housing and the rotor casing and/or between the hot gas housing and the rotor casing, and in that the sealing ring is composed of metal or plastic.

13. The pressure wave supercharger as claimed in claim 1, wherein the hot gas housing is manufactured from aluminum or a light metal alloy.

14. A method for operating a pressure wave supercharger for compressing fresh air for an internal combustion engine, wherein the pressure wave supercharger having:
   a cold gas housing, a hot gas housing, and a rotor casing, which is arranged therebetween, wherein a rotatable cell rotor is arranged within the rotor casing, the hot gas housing including a high-pressure exhaust duct and a low-pressure exhaust duct, the cell rotor being supported by a first bearing and by a second bearing arranged in the cold gas housing, the hot gas housing being cooled by a heat exchanger so that that the first bearing is cooled by arranged in a bearing seat and the bearing seat is cooled externally by a cooling liquid; a temperature sensor in the high-pressure exhaust duct; and the method comprising:

measuring a temperature in the high-pressure exhaust duct via the temperature sensor;

changing the cooling capacity of the heat exchanger in response to the temperature measured in the high-pressure exhaust duct;

reducing the cooling capacity of the heat exchanger during a cold start until the pressure wave supercharger reaches a minimum temperature (Tmin), and increasing the cooling capacity of the heat exchanger to cool the first bearing in the hot gas housing.

15. The method as claimed in claim 14, wherein an exhaust gas flow from the internal combustion engine flowing through at least one of the high-pressure exhaust duct or through a high-pressure exhaust feed line arranged upstream of the high-pressure exhaust duct is cooled.

16. The method as claimed in claim 14, wherein a cooling duct completely surrounds the high-pressure exhaust duct, at least along a cooling section, with the result that the high-pressure exhaust duct is cooled along the entire circumferential surface in the cooling section.

17. The method as claimed in claim 16, wherein a cooling duct completely surrounds the low-pressure exhaust duct, at least along a cooling section, with the result that the low-pressure exhaust duct is cooled along the entire circumferential surface in the cooling section.

18. The method as claimed in claim 14, wherein the cooling capacity of the heat exchanger during a cold start is reduced during a predetermined starting time period ($T_{st}$), and wherein the cooling capacity of the heat exchanger is increased on expiry of the starting time period ($T_{st}$).

19. A pressure wave supercharger for compressing fresh air for an internal combustion engine, comprising:

a cold gas housing, a hot gas housing, and a rotor casing, which is arranged therebetween;

wherein a rotatable cell rotor is arranged within the rotor casing;

wherein the hot gas housing comprises a high-pressure exhaust duct and a low-pressure exhaust duct;

wherein the cold gas housing includes a fresh air duct and a charge air duct;

wherein the high-pressure exhaust duct, the low-pressure exhaust duct, the fresh air duct and the charge air duct are fluidically connected to the cell rotor;

wherein the hot gas housing includes a first bearing, and the cold gas housing includes a second bearing;

wherein the cell rotor comprises a rotor shaft, which is mounted in the first and second bearings;

the rotor casing is an integral tubular barrel casing, which is connected to the hot gas housing and the cold gas housing;

the hot gas housing includes a heat exchanger for cooling at least the first bearing;

wherein the heat exchanger has cooling ducts, which extend within the hot gas housing; and wherein an additional heat exchanger cools a high-pressure exhaust feed line;

wherein the high-pressure exhaust feed line is arranged upstream of the high-pressure exhaust duct in the exhaust gas flow direction.

* * * * *